United States Patent [19]
Filion

[11] Patent Number: 5,770,057
[45] Date of Patent: Jun. 23, 1998

[54] OVERFLOW WATER SCREENING APPARATUS

[75] Inventor: Gilles Filion, Kirkland, Canada

[73] Assignee: John Meunier Inc., Montreal, Canada

[21] Appl. No.: 689,590

[22] Filed: Aug. 12, 1996

[51] Int. Cl.$^6$ .......................... B01D 35/02; B01D 35/22; E03F 5/14

[52] U.S. Cl. .......................... 210/162; 210/154; 210/407; 210/497.01

[58] Field of Search .................................. 210/162, 407, 210/154, 170, 497.01

[56] References Cited

U.S. PATENT DOCUMENTS

| 419,887 | 1/1890 | Robinson . |
| 454,185 | 6/1891 | Robinson . |
| 1,653,473 | 12/1927 | Schulz . |
| 2,090,997 | 8/1937 | French . |
| 2,128,345 | 8/1938 | Briggs . |
| 4,473,470 | 9/1984 | Loutit . |
| 4,689,145 | 8/1987 | Mathews . |

FOREIGN PATENT DOCUMENTS

| 36131 | 12/1891 | Canada . |
| 2743580 | 3/1979 | Germany . |

*Primary Examiner*—Thomas M. Lithgow
*Attorney, Agent, or Firm*—F. Martineau

[57] ABSTRACT

The water screening apparatus of the invention includes a conduit in which is positioned a discharge pipe opening through which water flowing in the conduit is to be dispatched completely during normal water flow conditions. The discharge pipe opening is positioned adjacent the conduit bottom wall portion so that as long as the water level does not rise above it, the water is completely dispatched therethrough. A bar screen is transversely disposed inside the water conduit and downwardly slopes from the conduit upstream end to the discharge pipe opening and covers the whole conduit width. When the water level rises above the discharge pipe opening, the water flowing above the discharge pipe opening will flow through the bar screen, the latter intercepting any macroparticles beyond a set threshold level carried by the water flow. These intercepted solid particles will slide along the bar screen under the pressure exerted by the water flow, to be carried in this way into the refuse discharge pipe to be disposed of along with part of the water flow. This way, during water overflow conditions, even if the water is not completely disposed of by means of the discharge pipe opening, the overflow water will not carry large solids or suspended matter, since it will be screened before being conveyed elsewhere, for example to a river.

13 Claims, 2 Drawing Sheets

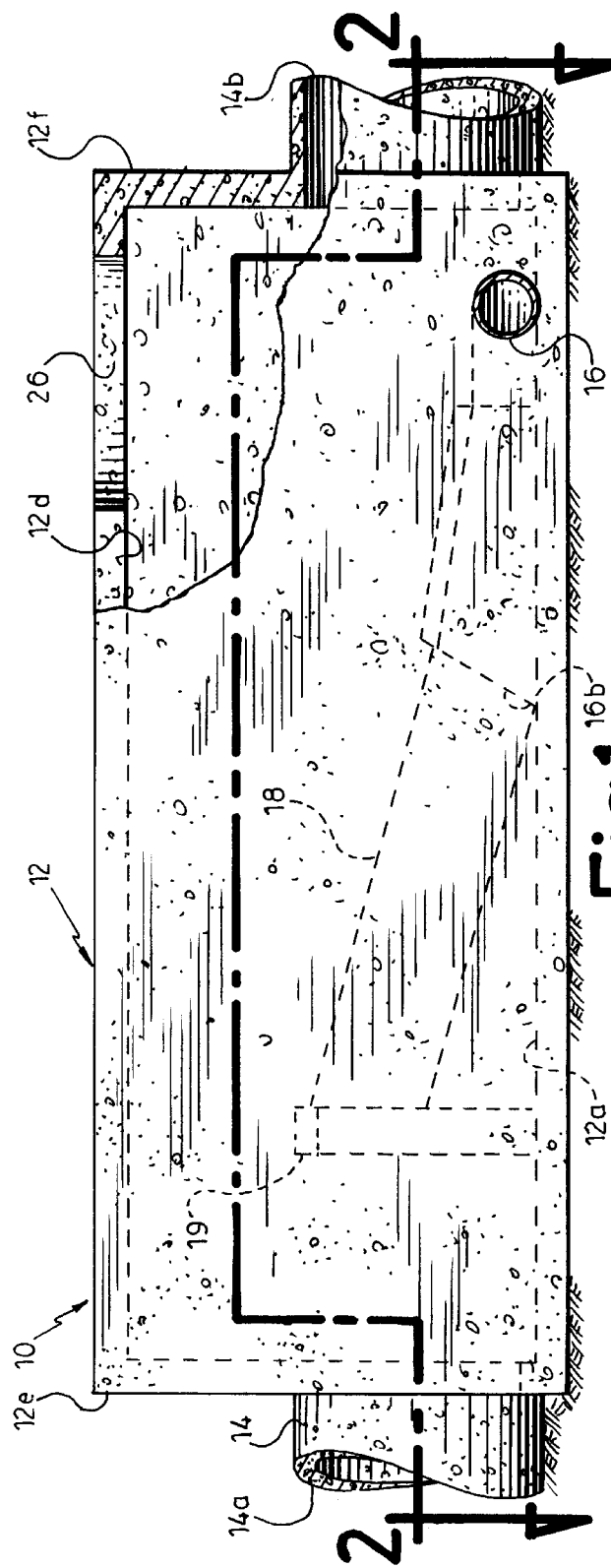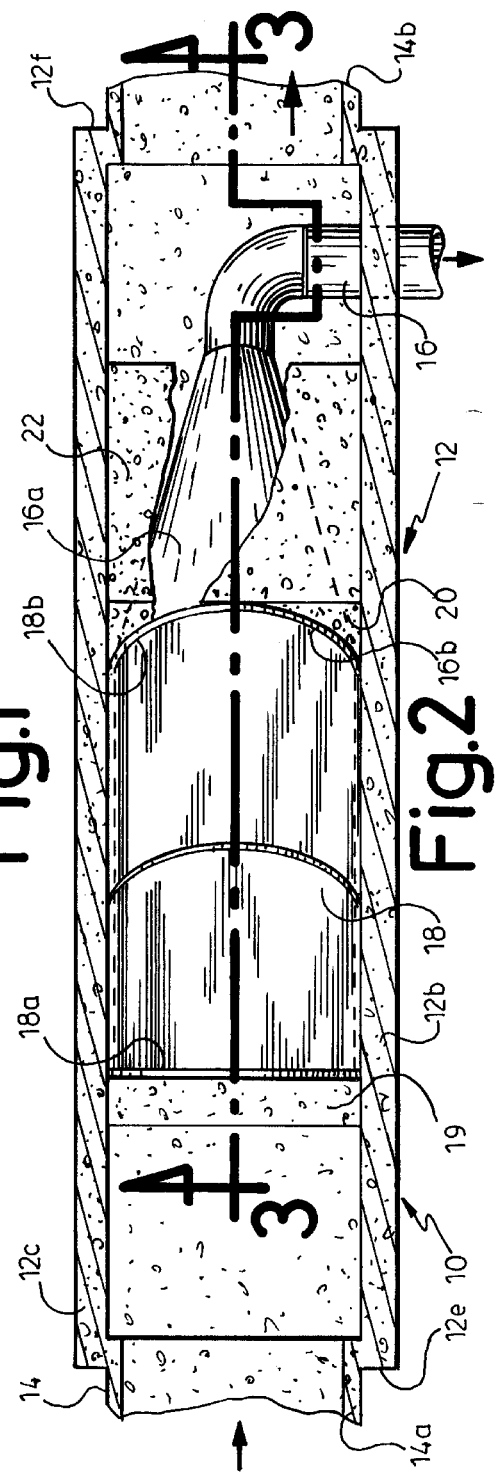

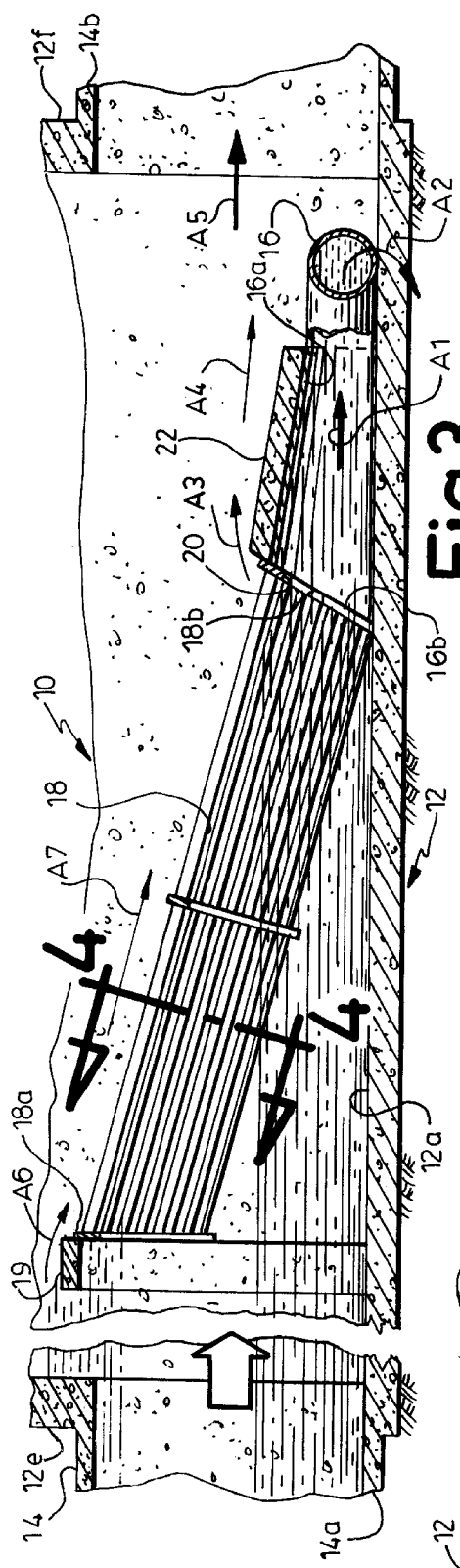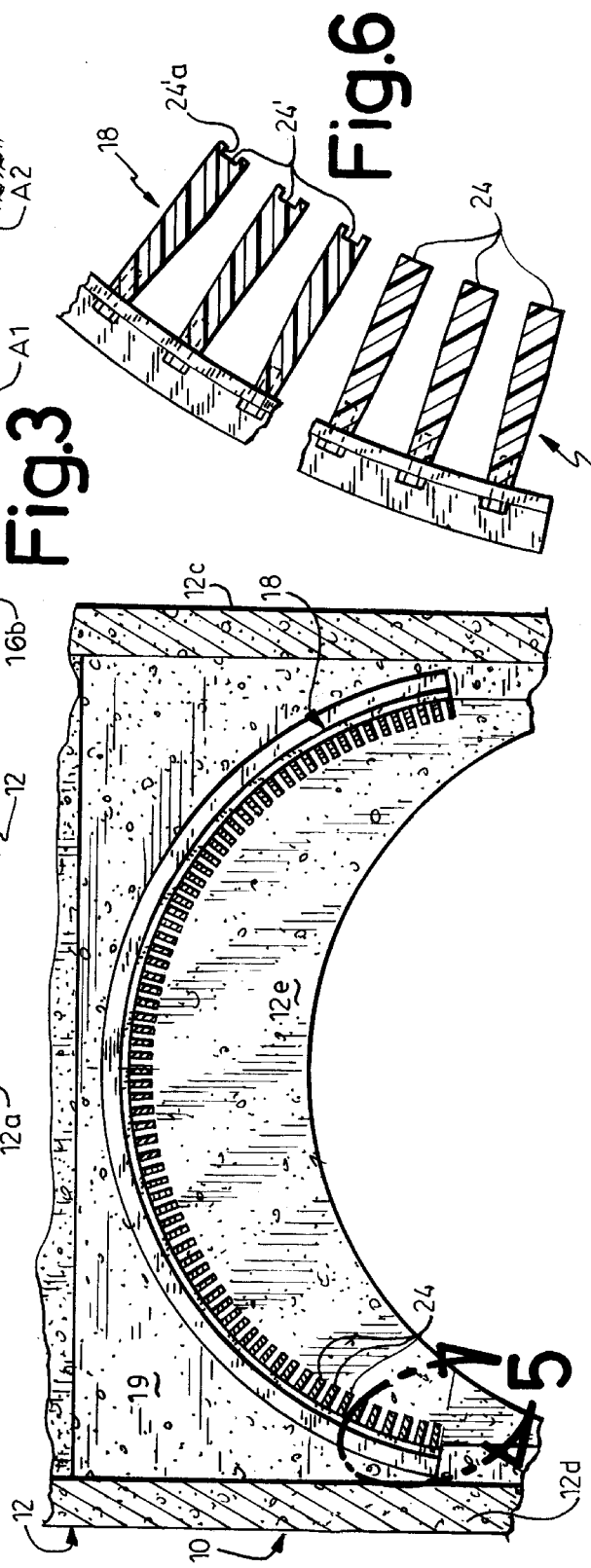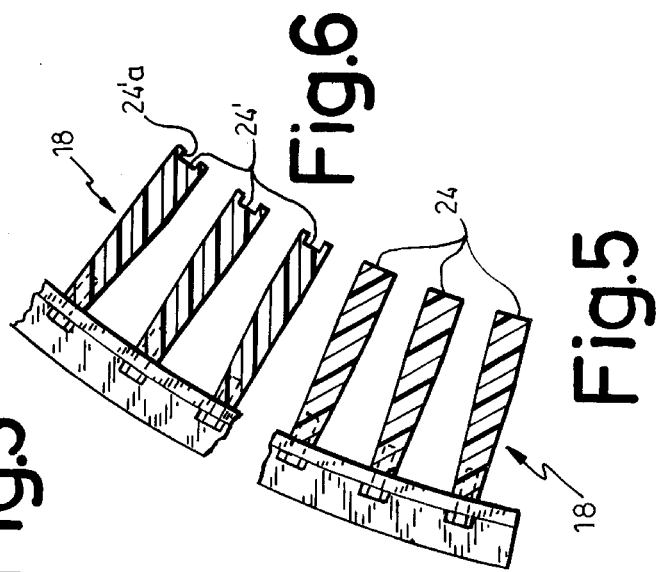

OVERFLOW WATER SCREENING APPARATUS

FIELD OF THE INVENTION

The present invention relates to water screens, and more particularly to a bar screen for screening overflow water carrying solid particulate matter or suspended matter.

BACKGROUND OF THE INVENTION

It is known to provide a bar screen to filter out solids from large water volumes flowing in ducts or the like. These solids are carried by the water flow into a smaller refuse outlet pipe to be disposed of properly.

U.S. Pat. No. 4,473,470 issued in 1984 to Loutit shows a screening apparatus used in a water conduit to screen out solids from the water flow. FIGS. 1, 2 and 6 of the Loutit patent show that the screening apparatus comprises a generally conical bar screen coaxially positioned inside the water conduit. The water is destined to flow through the bar screen, the solids carried in the water hitting the bars and travelling on the convergent bars to a discharge pipe to be conveyed with part of the water to a desired treatment or disposal location.

The main problem associated with the Loutit patent is that the water has to fill the large conduit at least half way up at all times for the solids to be carried into the discharge pipe. Indeed, due to the location of the outlet pipe at mid height of the water conduit, water flowing at a low level in the conduit will not be evacuated through the outlet pipe: this is not desirable, since the solids would then pile up and eventually clog the lower part of the water conduit. Even if the water level reaches the outlet pipe, the water current must be strong enough to carry the solids from the bottom of the water conduit and up the blades, thus working against the gravity force of these solids.

Canadian patent No. 36,131 issued in 1891 to Robinson shows a flat, inclined bar screen that gathers solids flowing into the water flow against a downstream closed gate located at the bottom of the conduit in which it is installed. When enough solids have been gathered, a second upstream gate is lowered to block off the whole water conduit and allow all the solids to be mechanically evacuated through the downstream gate, which is opened to allow this. It is disclosed that since there are many such conduits, if one of them is closed off by its upstream gate, the water can still flow through the other conduits.

Of course, this system cannot be used in a continuous fashion, and requires regular maintenance for the system to remain effective. Moreover, if the water flow is continuous, it is not possible to envision a single Robinson conduit, since the lowering of the upstream gate interrupting the water flow in the water conduit would cause this water to accumulate and possibly cause overflow problems near its source.

OBJECTS OF THE INVENTION

It is the gist of this invention to provide a water screening apparatus that allows water flowing at a low level in a conduit to be completely dispatched through a discharge pipe and that allows overflow water to be screened, the screened solids being continuously dispatched in the outlet pipe.

It is an important object of the invention that the screening apparatus allow a continuous flow of the water in the water conduit.

It is yet another object of the present invention that the screening apparatus be simple and as inexpensive as possible.

SUMMARY OF THE INVENTION

The present invention relates to water screens, and more particularly to a bar screen for screening overflow water carrying solids or suspended matter.

It is the main object of this invention to provide a water screening apparatus that allows water flowing at a low level in a conduit to be completely dispatched through a discharge pipe and that allows overflow water to be screened, the screened solids being continuously dispatched in the outlet pipe.

It is an important object of the invention that the screening apparatus allow a continuous flow of the water in the water conduit.

The present invention more particularly relates to a water screening device for use in a sewer conduit section, the sewer conduit section of the type having an upstream waste water intake end and a downstream end; the water screening device comprising:

(a) an elongated main housing, to be serially mounted to the conduit section in water-tight fashion, and diametrally at least as large as the conduit section, and defining a flooring, a ceiling, lateral opposite side walls, and upstream and downstream ends;

(b) a discharge pipe member, anchored to said main housing flooring and diametrally smaller than said main housing, said discharge pipe member having a first elongated funnel shape upstream section anchored to said main housing flooring axially to said elongated main housing and defining a diametrally enlarged upstream waste water intake port opening toward the upstream end of said main housing and a diametrally smaller opposite outlet end, a second downstream section extending through a side wall of said main housing and defining an inner end and a downstream waste water outlet port, and an elbowed section fluidingly interconnecting said pipe member first section outlet end and said pipe member second section inner end, said discharge pipe second section adapted to be fluidingly connected to a feed duct from a waste water processing plant; and (c) an elongated screening member, straddling both said lateral side walls, and defining a lower downstream end mounted to the upstream intake port of said discharge pipe, an upper upstream end mounted to the upstream end of said main housing and located in axial register therewith and proximate to the ceiling of said main housing, and an inclined main water screening body extending between said upstream and downstream ends of the screening member, said main water screening body for screening macroparticulate contaminants from the waste water from an upstream end of the sewer conduit; wherein:

(a) under dry time or light rainwater conditions, the waste water from the sewer conduit upstream end engages into said discharge pipe without being screened by said main screening body nor engaging into a downstream end of the sewer conduit; and (b) under moderate stormwater conditions, at least a fraction of the waste water from the conduit upstream end flows through said main screening body so that some water free of macroparticulate contaminants is allowed to flow beyond said main screening body and into the downstream end of the conduit.

Preferably, said screening member consists of a plurality of elongated bars arranged in spaced parallel fashion by transverse stay arms to which said bars are anchored at selected intervals, said elongated bars extending generally axially to said elongated main housing but in a downwardly inclined fashion relative to said downstream end of the main housing.

Advantageously, said screening member has a semi-cylindroid shape being downwardly concave, said stay arms being semi-circular.

Preferably, the underface of each said bar includes an elongated groove, said groove of decreasing cross-section from said upstream end to said downstream end of said main housing, to promote lengthwise flow of particulate contaminants therealong.

Preferably, said water screening device further includes an upright wall member anchored to said main housing flooring proximate to the upstream end thereof and with its top end extending short of said main housing ceiling, said upright wall member top end anchored to said upstream end of said semi-cylindroid screening member, said upright wall member having a lower notch sized to generally match and in axial register with the sewer conduit upstream end section, wherein an axial gap is defined therebetween and a top overflow passageway is defined between said upright wall member top end and said main housing ceiling; wherein under heavy stormwater conditions, at least a fraction of the waste water coming from the conduit upstream end is allowed to flow from said axial gap through said overflow passageway and above said screening member into said main housing and toward the sewer conduit downstream end, without having been screened from its macroparticulate contaminants by said screening member, so as to prevent undesirable water backflow into the sewer conduit upstream end in such severe weather conditions.

Preferably, the relative angle of said bar screen relative to the longitudinal axis of said main housing ranges between 10° and 45°.

Preferably, said relative angle of said bar screen is about 15°.

DESCRIPTION OF THE DRAWINGS

In the annexed drawings:

FIG. 1 is a side elevation, partly cut-away, of a screening apparatus according to the invention inserted in a water drainage pipe gap, showing in dotted lines the inner bar screen;

FIG. 2 is a cross-sectional top plan view of the screening apparatus of the invention, taken along line 2—2 of FIG. 1, and partly cut-away;

FIG. 3 is a partial sectional view taken along line 3—3 of FIG. 2;

FIG. 4 is an enlarged cross-sectional view taken along line 4—4 of FIG. 3 with a fraction of the upper section of the upstream end of the condtui section containing the screening apparatus being apparent beneath the arcuate bar screen along a crescent shape part; and FIGS. 5 and 6 are enlarged views of the area within ellipse 5 of FIG. 4, showing two different embodiments of the bars from the bar screen.

DETAILED DESCRIPTION OF THE EMBODIMENTS

FIGS. 1 to 3 show an overflow water screening apparatus 10 comprising a hollow conduit 12 serially mounted to a conventional, cylindrical water drainage pipe 14. Drainage pipe 14 has an upstream end 14a and a downstream end 14b and is destined to convey a water flow from upstream end 14a to downstream end 14b, to be disposed of in a conventional fashion, e.g. into a river. The water flow can originate from a city sewer duct system, for example. Conduit 12 is of course serially attached to the adjacent end sections of pipe 14 in a fluid tight fashion, e.g. integrally as suggested in FIG. 1.

Conduit 12 has a quadrangular cross-section, as illustrated in FIG. 4, although a round cross-section or any other suitable shape are envisioned within the scope of this invention, with corresponding changes to the shape of the other related parts of the water screening apparatus.

Conduit 12 defines a bottom wall portion 12a (FIGS. 1 and 3) which is flat, a pair of upright side wall portions 12b and 12c and an overlying top wall portion 12d. Conduit 12 further defines an upstream end 12e and a dowstream end 12f.

Screening apparatus 10 further comprises a refuse discharge pipe 16 (FIG. 2) which has a cross-sectional area being much smaller than that of the conduit 12 or drainage pipe 14. Refuse discharge pipe 16 has a semi-frusto-conical fluid outlet portion 16a which lies directly against conduit bottom wall portion 12a, with its concavity downwardly oriented so as to define a fluid intake port 16b (FIG. 3). Refuse discharge pipe intake port 16b faces conduit upstream end 12e so as to receive at least part of the water flowing into conduit 12. This water then flows into refuse discharge pipe 16, the latter conveying the water out of conduit 12 to be disposed of or treated in a proper fashion.

A substantially semi-cylindrical bar screen 18 is fixedly and transversely attached in conduit 12, with its concavity downwardly oriented, and defines a first upstream end 18a and a second downstream end 18b. Upstream end 18a is fixedly attached to an upright wall 19 having a semi-circular opening registering with and lined by semi-circular bar screen first end 18a. Upright wall 19 is positioned near conduit upstream end 12e spacedly therefrom. Bar screen 18 slopes downwardly towards conduit downstream end 12f to its second end 18b which is fixedly attached to the periphery of diametrally smaller refuse discharge pipe opening 16b and which registers therewith. Unexpectedly high performance has been obtained when the inclination of bar screen 18 ranges between 10° and 45°, particularly at about a 15° angle.

Bar screen 18 extends from one conduit side wall 12c to the other side wall 12d, and thus covers the whole conduit width at any vertical cross-section between upright wall 19 and refuse discharge pipe opening 16b, except in the half-moon shape of the refuse discharge pipe opening 16b. Indeed, the water flow path towards discharge pipe opening 16b is free from any structural elements for the water to flow freely therein in a continuous fashion. This way, the water is more likely to flow unobstructed directly into refuse discharge pipe 16, since the absence of any interveening structural elements will help prevent clogging of the conduit 12 and/or discharge pipe 16 due to the accumulation of debris in the water flow path. This characteristic of the invention is very important, since it allows a continuous water flow without any human or mechanical intervention.

In use, if the waste water level from conduit 14 is relatively low, e.g. during dry time or light rainwater conditions, the waste water will flow along conduit bottom wall 12a directly through fluid intake port 16b and into discharge pipe 16, for release to a waste processing plant at a remote location. In this low water level state, it is important, according to the objects of the invention, to completely dispatch the water through the instrumentality of the discharge pipe 16. A wall 20 (FIG. 2) is positioned at—and perpendicular to—bar screen second end 18b and is therefore inclined upwardly downstream relative to a vertical plane. Wall 20 prevents the waste water from flowing around semi-circular intake port 16b of discharge pipe 16 through bar screen 18 near its downstream end 18b towards conduit downstream end 12f at low water levels. Indeed, wall 20 is as high as the uppermost point of the discharge pipe intake port 16b, and consequently the water level must rise over this point to flow in conduit 12 beyond discharge pipe intake port 16b.

When the waste water from conduit 14 rises above the top level of wall 20, the waste water flows over a downwardly sloping top wall 22 (FIG. 3) and through conduit donwstream end 12f into the downstream end portion 14b of conduit 14 towards a river or any chosen disposal destination.

Upright wall 19 is spaced from the conduit upstream end 12e and thus a horizontal gap is defined therebetween. This provides overflow bypass capability to allow the water to flow over upright wall 19 in case of important clogging of the bar screen, resulting in a water backflow towards conduit upstream end 12e. The water will then flow over the top surface of bar screen 18 to be conveyed directly out through conduit downstream end 12f and into main conduit downstream end 14b, instead of undesirably back-flowing into drainage pipe upstream end 14a if there were no such gap between the conduit upstream end 12e and the bar screen first end 18a.

Therefore, if the water level is relatively lower than the uppermost point of discharge pipe opening 16b, the whole water flow will be conveyed into refuse discharge pipe 16, as suggested by arrows A1 and A2 in FIG. 3. In dry time or in normal light rain water loading conditions, all of the water from conduit 14 is destined to be completely dispatched in this way to a remote waste water treatment plant at the downstream end of discharge pipe 16.

During storm water conditions, the water level may rise above wall 20, so that the water will flow into discharge pipe 16 up to the level of wall 20, and the water above this level will flow through bar screen 18 and out through conduit downstream end 12f, as suggested by arrows A3, A4 and A5, thus being effectively screened by bar screen 18. Accordingly, as in the previous paragraph, all macroparticulate contaminants screened by bar screen 18 will remain beneath inclined screen 18, to flow with underlying waste water through discharge pipe intake port 16b into discharge pipe 16 toward the waste water processing plant (not illustrated). Therefore, in this situation, the water that will be allowed to escape freely to the downstream portion 14b of main conduit 14, will be water that will have been previously screened, i.e. purified from the macroparticulate contaminants before return to the outdoor discharge lake or river at the downstream end of main conduit 14b. This obviously will substantially prevent macroparticulate material from contaminating the body of water (lake, river, etc . . .) into which the sewer water is discharged at the downstream end of pipe 14b. Such water overflow situations usually occur during more important water downpours and thunderstorms.

Should clogging of the bar screen 18 and/or the discharge pipe 16 by water-carried debris occur, the water level will be allowed to rise above the uppermost point of upstream upright wall 19 and flow over it and over bar screen 18 and directly out through the conduit downstream end 12f without being screened, as suggested by arrows A6 and A7 in FIG. 3. Since this last situation is rather rare, it is accepted by most city regulations, although there is still some macroparticulate contamination of the water body at the downstream end of main conduit 14b, because these regulations do not require the extreme water overflows to be completely screened. Furthermore, this last situation should occur only if there is clogging of the bar screen 18 and/or the discharge pipe 16, since the opening in upright wall 19 is diametrally equal to the opening in drainage pipe 14 and thus if there is no clogging in conduit 12, the water would be allowed to flow through it without back-flowing.

It is understood that, due to the axial flow of waste water along the underface of bar screen 18, the bar screen will be self-cleaning from particulate contaminants during moderate to heavy stormwater conditions. That is to say, the hydrodynamic forces involved in the water flow beneath the bar grate between sections 14a and pipe section 16b should substantially prevent particulate material from getting stuck between a pair of successive bars from the bar screen 18, since this particulate material will be drawn by the water flow toward and into discharge pipe 16 while some water free of this macroparticulate contaminant will be allowed to escape through screen 18 and into downstream conduit portion 14b. Accordingly, the bar screen will be automatically cleaned solely under hydrodynamic forces, without the need of external power-driven cleaning apparatuses as was the case in prior art systems. Therefore, an almost mainenance-free situation is obtained, an unexpected and unobvious consequence of such a bar screen arrangement inside a sewer conduit. Obviously, condiderable savings in labour costs and machinery capital outlay are enabled.

Bar screen 18 is composed of a plurality of bars 24 which are spaced from one another and which are longitudinally disposed to form bar screen 18. Bars 24 are radially arranged in cross-section, as shown in FIGS. 4 and 5. FIG. 6 shows a second preferred embodiment of the bars 24' having transversely-cut longitudinal grooves 24'a at their underface.

In use, when the water flows through bar screen 18, the solids which are larger than the bar inter-spaces, i.e. the gap between any two successive bars 24, 24, will hit the bars 24 or 24' and will slide therealong, being propelled by the water flow, into the discharge pipe 16 to be disposed of at a waste processing plant. The grooves 24'a help prevent clogging of these solids by allowing a thin water flow to seep between the bars 24' and the solids sliding or stuck therealong. This thin water flow will help prevent the solids from sticking on the bars, thus providing self-cleaning capability for the bar screen 18. Thus, the water which flows out of conduit 12 through conduit downstream end 12f will, in normal rain water conditions, be free of larger water-carried solids.

Preferably, the cross-sectional area, and most preferably the depth only, of grooves 24'a will decrease from bar screen first end 18a to bar screen second end 18b. This will help prevent the solids from sticking on the bars 24' by slightly increasing the pressure exerted by the thin water flow trapped within grooves 24'a between bars 24' and the solids sticking on bars 24'. Preferably, bars 24, 24 will be of the type as generally disclosed in applicant's co-pending U.S. patent application Ser. No. 08/664,041 filed Jun. 13, 1996, which is incorporated by way of reference to the present application; wherein unexpectedly high performance of the bar screen is achieved.

The bar screen 18 is preferably inclined at approximately a 15° angle, though any angle between 10° and 45° is acceptable.

It is understood that the screening apparatus according to the invention has two important positions:

1) an upstream position, which is located at upright wall 19, where bar screen 18 originates; and
2) a downstream position, at discharge pipe opening 16b.

The length of conduit 12 upstream and downstream from these two positions is rather unimportant, since no screening function actually takes place there. Indeed, bar screen first end 18a could be fixedly attached to the conduit upstream end 12e, thus removing the overflow gap between upright wall 19 and conduit upstream end 12e, without preventing the use of screening apparatus 10, though a more regular surveillance by a maintenance person would probably be necessary.

FIG. 1 shows that a manhole access port 26 is positioned in the conduit upper wall portion 12d to allow an access inside conduit 12 to a maintenance person. This is desirable, for it can become necessary to remove large solids caught in the bar screen 18 or at the discharge pipe opening 16b. It is consequently envisioned that the bar screen 18 be pivotable or removable, preferably pivotable at its first end 18a, to allow access of the maintenance person to the solids clogging the conduit 12.

It is understood that although a substantially semi-cylindrical shaped is illustrated as being preferred for the bar screen 18, other suitable shapes could also be envisioned, provided the functional features and the performance thereof are not adversely affected, and provided that complementary changes be made to the structure of the main housing 12, to the upstream end portion 16b of pipe 16, and to wall 19. For example, an inversely V-shaped bar screen (not illustrated) could be envisioned, or even a flat bar screen (not illustrated) would not be excluded as such from the possible operative shapes for the bar screen, provided the screen member is always downwardly inclined in the downstream direction. The important feature is that, in dry time or light rainwater conditions, most if not all of the waste water from upstream duct 14a feeds the remote waste processing plant via discharge pipe 16, whereas during moderate stormwater conditions, a fraction of the waste water flows through the screen 18 to escape into the downstream duct section 14b to an outdoor natural discharge area.

I claim:

1. An overflow water screening apparatus comprising:
   a) an elongated conduit defining a bottom wall portion, two lateral side portions, an upstream end section and a donwstream end section, said conduit being destined to convey a water flow from said upstream to said dowstream end sections;
   b) a refuse discharge pipe fixedly installed in said conduit and having an inlet opening inside said conduit proximate said downstream end section, said inlet opening having a smaller cross-section than said conduit, said inlet section facing said upstream end section and being located adjacent said conduit bottom wall portion;
   c) a bar screen fixedly and transversely attached in said conduit and defining a first end mounted to said upstream end section and a second end mounted to said conduit adjacent said inlet opening, said bar screen being inclined so as to slope downwards from said upstream end portion to said refuse discharge pipe inlet opening but clearing said inlet opening, said bar screen straddling said lateral side portions of the conduit from said upstream end section to said inlet opening except at said inlet opening, said bar screen having a plurality of longitudinally arranged bars which are spaced from one another in successive pairs, said bars anchored to one another at selected intervals by transverse arcuate arms; said bar screen having a substantially semi-cylindrical shape being downwardly concave, said inlet opening having a peripheral shape registering in a complementary fashion with said bar screen downstream end; said conduit being continuously free of any structural elements between said upstream end section and said dowstream end section so as to allow a continuous water flow therethrough.

2. A screening apparatus as defined in claim 1, wherein each said bar of said bar screen defines a radially inner surface having a longitudinal groove radially cut therein.

3. A screening apparatus as defined in claim 2, wherein each said groove has a cross-section of decreasing size from said bar screen upstream end to said bar screen downstream end.

4. A screening apparatus as defined in claim 1, wherein each said bar of said bar screen defines a radially flat inner surface.

5. A screening apparatus as defined in claim 1, wherein said conduit defines a longitudinal axis, said bar screen being inclined at an angle between 10° and 45° relative to said conduit section longitudinal axis.

6. A screening apparatus as defined in claim 5, wherein said bar screen is inclined by approximately a 15° angle relative to said conduit longitudinal axis.

7. A screening apparatus as defined in claim 1, further comprising overflow means allowing at least a fraction of the water flow from said conduit upstream end section to be redirected towards said conduit downstream end section, reactively to at least partial clogging of said bar screen.

8. A water screening device for use in a sewer conduit section, the sewer conduit section of the type having an upstream waste water intake end and a downstream end; the water screening device comprising:
   (a) an elongated main housing, to be serially mounted to the conduit section in water-tight fashion, and diametrally at least as large as the conduit section, and defining a flooring, a ceiling, lateral opposite side walls, and upstream and downstream ends;
   (b) a discharge pipe member, anchored to said main housing flooring and diametrally smaller than said main housing, said discharge pipe member having a first elongated funnel shape upstream section anchored to said main housing flooring axially to said elongated main housing and defining a diametrally enlarged upstream waste water intake port opening toward the upstream end of said main housing and a diametrally smaller opposite outlet end, a second downstream section extending through a side wall of said main housing and defining an inner end and a downstream waste water outlet port, and an elbowed section fluidingly interconnecting said pipe member first section outlet end and said pipe member second section inner end, said discharge pipe second section adapted to be fluidingly connected to a feed duct from a waste water processing plant; and
   (c) an elongated screening member, straddling both said lateral side walls, and defining a lower downstream end mounted to the upstream intake port of said discharge pipe, an upper upstream end mounted to the upstream end of said main housing and located in axial register therewith and proximate to the ceiling of said main housing, and an inclined main water screening body extending between said upstream and downstream ends of the screening member, said main water screening body for screening macroparticulate contaminants from the waste water from an upstream end of the sewer conduit, said screening member consisting of a plurality of elongated bars arranged in spaced parallel fashion by transverse stay arms to which said barn are anchored at selected intervals, said elongated bars extending generally axially to said elongated main housing but in a downwardly inclined fashion relative to said downstream and of the main housing, said screening member has a semi-cylindroid shape being downwardly concave, said stay arms being semi-circular; wherein:

(a) under dry time or light rainwater conditions, the waste water from the sewer conduit upstream end engages into said discharge pipe without being screened by said main screening body nor engaging into a downstream end of the sewer conduit; and (b) under moderate stormwater conditions, at least a fraction of the waste water from the conduit upstream end flows through said main screening body so that some water free of macroparticulate contaminants is allowed to continuously flow beyond said main screening body and into the downstream end of the conduit.

9. A water screening device as defined in claim 8, wherein the underface of each said bar includes an elongated groove, said groove of decreasing cross-section from said upstream end to said downstream end of said main housing, to promote lengthwise flow of particulate contaminants therealong.

10. A water screening device as defined in claim 9, further including an upright wall member anchored to said main housing flooring proximate to the upstream end thereof and with its top end extending short of said main housing ceiling, said upright wall member top end anchored to said upstream end of said semi-cylindroid screening member, said upright wall member having a lower notch sized to generally match and in axial register with the sewer conduit upstream end section, wherein an axial gap is defined therebetween and a top overflow passageway is defined between said upright wall member top end and said main housing ceiling;

wherein under heavy stormwater conditions, at least a fraction of the waste water coming from the conduit upstream end is allowed to flow from said axial gap through said overflow passageway and above said screening member into said main housing and toward the sewer conduit downstream end, without having been screened from its macroparticulate contaminants by said screening member, so as to prevent undesirable water backflow into the sewer conduit upstream end in such severe weather conditions.

11. A water screening device as defined in claim 8, wherein the relative angle of said bar screen relative to the longitudinal axis of said main housing ranges between 10° and 45°.

12. A water screening device as defined in claim 11, wherein said relative angle of said bar screen is about 15°.

13. A water screening device as defined in claim 8, further including a manhole access port, made at the ceiling of said main housing, proximate the downstream end thereof.

* * * * *